June 25, 1929.     H. E. FORMAN     1,718,641
ROPE FASTENER
Filed Nov. 30, 1928
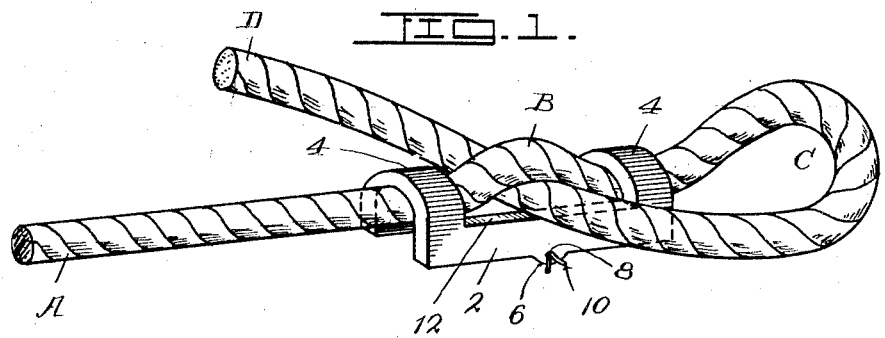
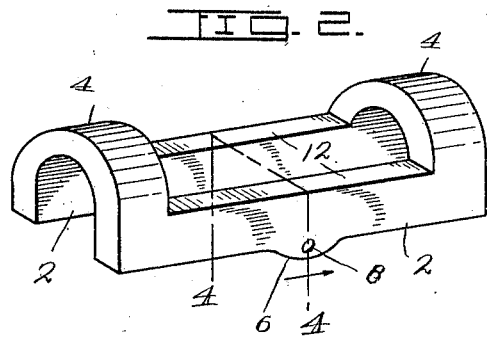
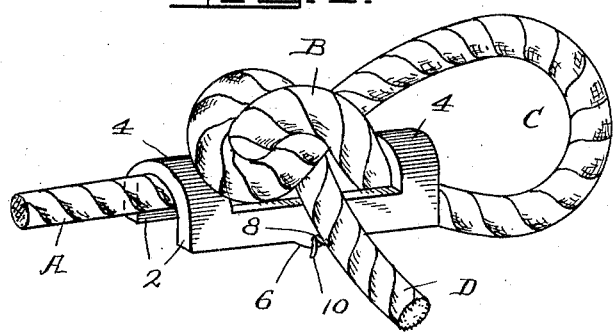 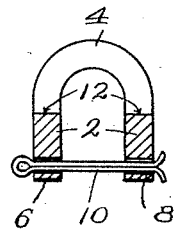
Inventor
Henry E. Forman,
Witness:
Fred C. Fischer,
By F. G. Fischer,
Attorney.

Patented June 25, 1929.

1,718,641

UNITED STATES PATENT OFFICE.

HENRY E. FORMAN, OF KANSAS CITY, MISSOURI.

ROPE FASTENER.

Application filed November 30, 1928. Serial No. 322,676.

My invention relates to rope fasteners and one object is to provide a device of this character which is adapted to secure a rope, chain, or wire cable in the form of a loop and thus avoid the necessity of tying a knot in said rope, chain, or cable.

A further object is to provide a device of this character which can be quickly applied to any portion of a rope without running the latter through the device, hence should the rope be knotted the device can be applied in front or at the rear of one of the knots.

The device can be used to advantage on tow ropes, swing ropes, tent ropes, etc., and in order that the invention may be fully understood reference will now be had to the accompanying drawing, in which:

Fig. 1 is a perspective view of the device applied to a rope for holding one end of the latter in the form of a loop.

Fig. 2 is a perspective view of the device.

Fig. 3 is a perspective view of the device with the rope secured thereto in a firmer manner than that disclosed by Fig. 1.

Fig. 4 is a cross section of the device on line 4—4 of Fig. 2.

Preferably, the device is cast in one piece and consists of a pair of longitudinal side bars 2 united at their ends with upwardly extending transverse members 4 which are rounded to fit the shape of the rope. The side bars 2 are preferably parallel with each other and are spaced apart so that a rope can be placed between them. Each side bar 2 has a reinforcement 6 at its lower intermediate portion with a transverse opening 8 for the reception of a cotter pin 10.

In the application of the device to the rope A the latter is placed between the bars 2 and against the under rounded sides of the transverse members 4. The rope is then drawn upwardly between the transverse members 4 to form a bight portion B, after which the rope is formed into a loop C, the free end D of which is passed between the top of the side bars 2 and the under side of the bight B. The other end of the rope is then pulled to draw the bight B down upon the underlying portion of the rope and bind the same tightly upon the seats 12 forming the upper margin of the bars 2.

In Fig. 3 the free end D of the rope is secured in much the same manner as shown by Fig. 1, excepting that said free end D is looped around the bight B instead of merely extending between the latter and the seats 12.

When the rope A is not in use the device may be secured against loss by slipping it down upon the rope and then placing a cotter pin 10 through the holes 8.

The device is made in different sizes to accommodate ropes of different diameters and of a weight to withstand the strains to which it is subjected, and being formed preferably from one casting has no parts to become lost.

While I have shown a preferred embodiment of the invention I reserve all rights to such changes and modifications thereof as properly fall within the spirit and scope of the invention as claimed.

Having thus described my invention, what I claim and desire to secure by Letters Patent, is:

1. A rope fastener consisting of two side bars reinforced intermediate their ends, transverse members uniting said side bars, and a pin adapted to extend through openings in the reinforcements.

2. A one-piece rope fastener consisting of a pair of side bars spaced apart to admit the rope and having seats at their upper surface, and transverse members uniting said side bars and rounded to fit the rope and spaced apart so that a portion of the rope may be formed into a bight, one end of the rope being formed into a loop the extremity of which is passed between said bight and the seats upon said side bars.

In testimony whereof I affix my signature.

HENRY E. FORMAN.